(12) United States Patent
Kanke et al.

(10) Patent No.: US 6,839,643 B2
(45) Date of Patent: Jan. 4, 2005

(54) FLOWMETER AND FLOWMETER SYSTEM

(75) Inventors: Atsushi Kanke, Hitachi (JP); Masahiro Matsumoto, Hitachi (JP); Shinya Igarashi, Ibaraki (JP); Keiji Hanzawa, Mito (JP); Kei Ueyama, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/253,542

(22) Filed: Sep. 25, 2002

(65) Prior Publication Data

US 2004/0002821 A1 Jan. 1, 2004

(30) Foreign Application Priority Data

Jun. 19, 2002 (JP) ........................................ 2002-177870

(51) Int. Cl.[7] .............................................. G06F 19/00
(52) U.S. Cl. .................... 702/45; 702/100; 702/116; 73/118.2; 701/102
(58) Field of Search ................................. 701/102, 103, 701/108; 702/100, 116, 45; 73/118.2, 204.11, 204.15, 204.18, 204.26

(56) References Cited

U.S. PATENT DOCUMENTS 5,750,889 A * 5/1998 Kowatari et al. .......... 73/118.2

6,397,673 B1 * 6/2002 Kanke et al. ............. 73/204.11

FOREIGN PATENT DOCUMENTS

| JP | 62-821 | 1/1987 |
|----|--------|--------|
| JP | 6-265565 | 9/1994 |
| JP | 8-94406 | 4/1996 |
| JP | 8-511627 | 12/1996 |
| JP | 9-15103 | 1/1997 |
| JP | 11-316145 | 11/1999 |
| JP | 11-337382 | 12/1999 |

* cited by examiner

*Primary Examiner*—John Barlow
*Assistant Examiner*—Stephen J. Cherry
(74) *Attorney, Agent, or Firm*—Crowell & Moring LLP

(57) ABSTRACT

In a thermal-type airflow meter that measures an intake airflow rate in an internal combustion engine of an automobile or the like, there has been a problem that pulsation errors caused by external fluctuations under the environment including a large pulsation and reverse flow in the intake valve are difficult to be reduced. In order to solve this problem, the invention provides a flowmeter comprising a detection element that outputs a non-linear signal corresponding to a flow rate, and a regulation means that regulates an output signal of the detection element for controlling. With this construction, the regulation means executes output regulation processing that regulates irregularities of the detection element in the output signal, and inequality linearization processing that regulates an average value of the output signal after the output regulation processing by means of regulating parameters.

20 Claims, 16 Drawing Sheets

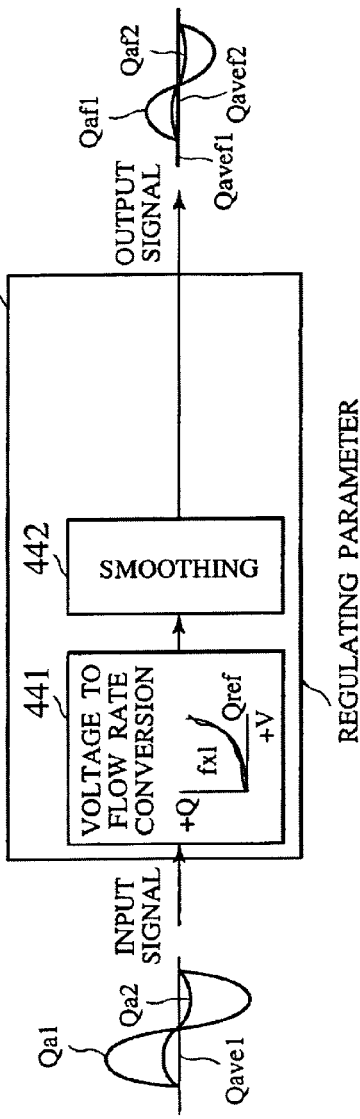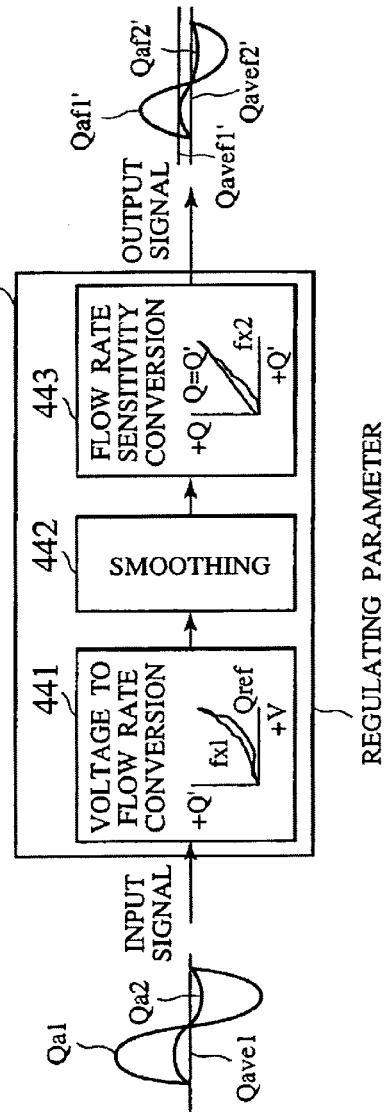
FIG.4A THE PROCESSING NOT BEING APPLIED
FIG.4B THE PROCESSING BEING APPLIED

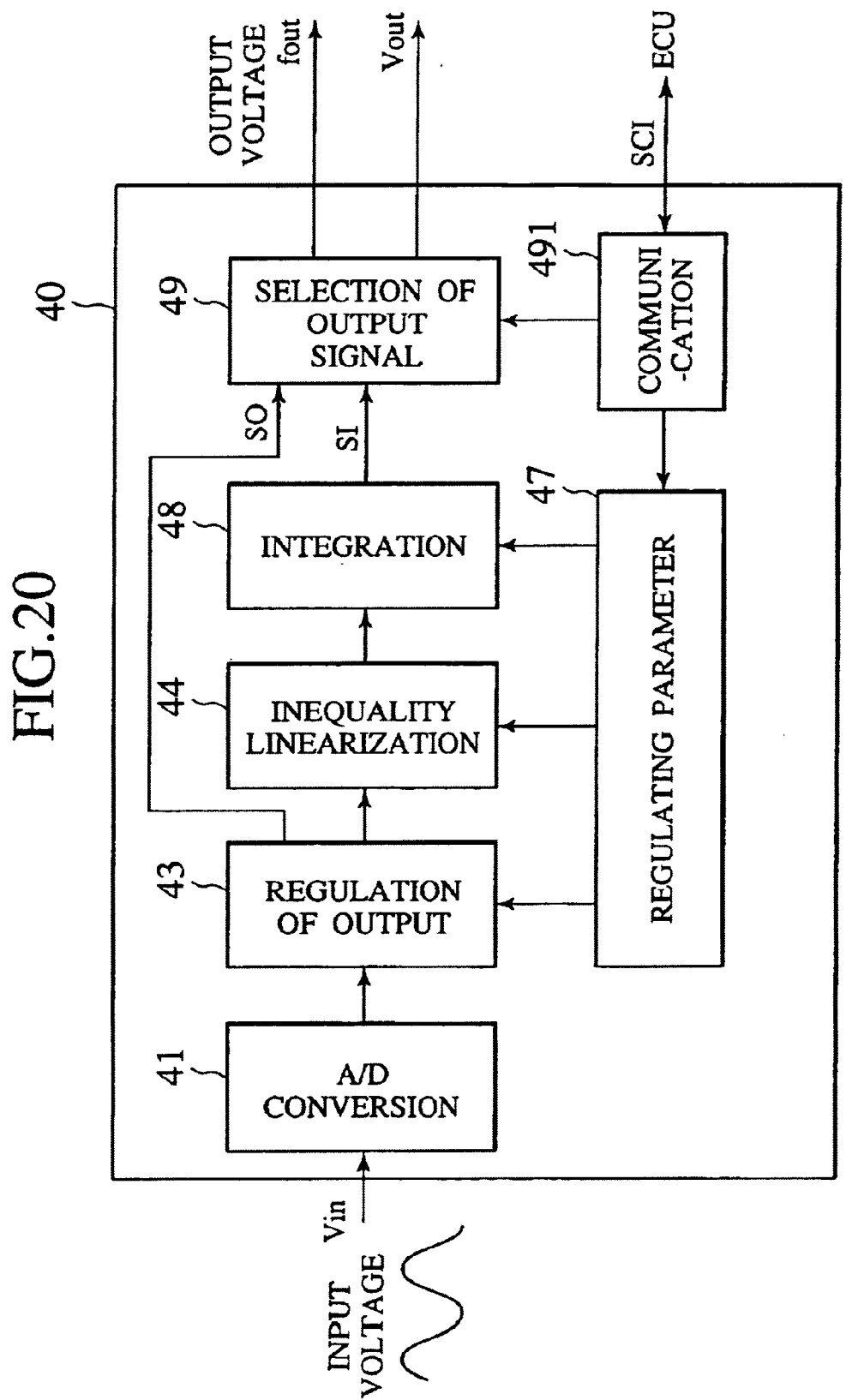

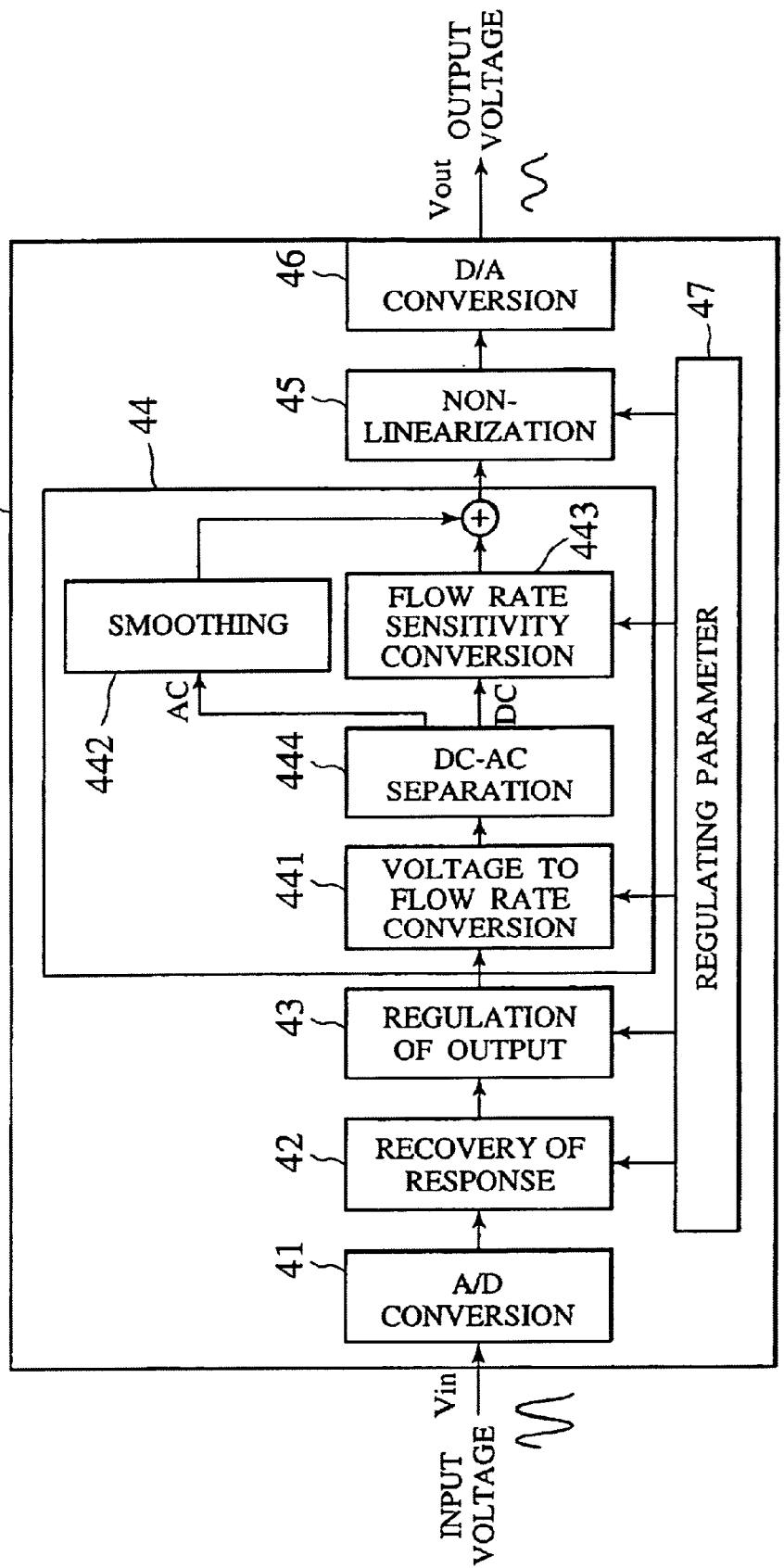

FLOWMETER AND FLOWMETER SYSTEM

BACKGROUND OF THE INVENTION

The present invention relates to a flowmeter that measures a flow rate of air and gas, and a flowmeter system using the flowmeter.

As an airflow meter to measure an intake airflow rate, which is installed on an electronic controlled fuel injection system for an internal combustion engine of an automobile or the like, the thermal-type airflow meter has been widely used because it is able to directly detect an air mass flow. In this case, a heating resistor is made up by winding a platinum wire on a bobbin and coating it with glass, or by forming a thin film resistor on a ceramic substrate or on a silicon substrate, or the like. As a method of detecting a flow rate, the following can be cited. One system is to heat a heating resistor to a constant temperature, and to directly detect a flowing current when there occurs a flow. Another one is to place temperature detecting resistors on both sides of the heating resistor, and to detect a flow rate by a temperature difference between the temperature detecting resistors.

In case of a pulsating flow that involves high pulsating amplitude of an intake airflow rate and partly accompanies a reverse flow, as in case of a low speed of rotation of less than four cylinder engine and a heavy load being applied, the conventional airflow rate measuring device lacks in accuracy; and there is a well known flowmeter disclosed in Japanese Patent Laid-open No. 62-821.

In order to compensate a dynamic pulsation characteristic including a reverse flow, there are methods for an engine control unit and so forth to modify a characteristic curve in a reverse flow region by using a reverse flow discriminating sensor, which are disclosed in Japanese Patent publication No. 8-511627, and the Japanese Patent Laid-open No. 9-15013.

As a method of reducing errors in pulsations, the following are disclosed in Japanese Patent Laid-open No. 11-316145 and No. 11-337382 and so forth, in which an engine control unit or a sensor controlling microcomputer converts a non-linear sensor output signal into a linear signal (flow rate) by using a map or the like to convert it into an airflow rate, and reduces a pulsating amplitude by a filter, and thereafter applies non-linearization processing to the signal again, thus decreasing the amplitude of the final output signal to thereby reduce the errors.

Japanese Patent Laid-open No. 6-265565 and so forth disclose a construction, in which a sensor output of a current meter used for a measuring device is converted into a digital value by an A/D converter, the characteristic is adjusted by means of the functional expression of a memory that records specified coefficients, and the results are put on the display, or the sensor output is converted into an analog value by a D/A converter to output in voltage. With the same construction, a method of reducing influences of fluctuating flow velocity due to pressure fluctuations and so forth is disclosed in the Japanese Published Unexamined Patent Application No. 8-94406, in which the sensor output is converted into a digital value by an A/D converter, and after being linearized, the average is calculated, whereby a flow rate without error can be presented according to the document. These are to be used for making up a closed system as a flow rate measuring device.

SUMMARY OF THE INVENTION

In general, the relation between a sensor output of a thermal type flowmeter using a heating resistor and an airflow rate is described by the following expression, which is called the King's expression.

$$Ih \cdot Ih \cdot Rh = (C1 + C2\sqrt{Q})(Th - Ta) \quad (1)$$

where Ih represents a hot-wire current, Rh a hot-wire resistance, Th a surface temperature of a hot-wire, Ta a temperature of atmosphere, Q an airflow rate, C1 and C2 constants determined by the hot-wire. Generally, the sensor output is detected in the form of a voltage value obtained by flowing the hot-wire current Ih through a resistor. An engine control unit used for controlling an internal combustion engine converts a sensor output voltage into a flow rate based on the relation of the expression 1, and controls the rate of air and fuel in the internal combustion engine. However, the relation between the sensor output signal of the thermal type flowmeter and the flow rate in practice is nonlinear (fourth root of the flow rate is the voltage value), which requires any linearization means in order to use a signal as a flow rate.

In the conventional technique, for reducing the detection error in regard to the fluctuations in pulsating dynamic flows, there is a method that converts the sensor voltage signal into the airflow rate to linearize it, reduces in the linear region the pulsating amplitude by using a lowpass filter and the like, and executes averaging processing. The method restores the result again as needed to the non-linear signal being the original signal form, and makes the signal immune to pulsations as a final object.

There is another method that measures, when an intake valve called a reverse flow overlaps in a high pulsation region, a pulsating flow by using a sensor capable of detecting the reverse flow, in order to capture the spitting phenomenon of an air that returns from the exhaust valve to the intake valve in a positive pressure as the piston goes up. Here, in order to eliminate influences by the differences in the response of the sensor and in the sensitivity of the reverse flow, the method modifies the characteristic expression of the reverse flow side in the expression 1, and thereby decreases the error of the pulsating flow including the reverse flow.

However, in case of a new internal combustion engine involving a recent valve mechanism that makes the exhaust valve variable, etc., pressure fluctuations and disturbances in the waveform of flow are likely to occur. The levels of the pulsations and the reverse flows are high, and they are likely to vary depending on the external conditions such as the number of revolutions of the internal combustion engine and so forth, which is a problem to be solved. Accordingly, it has been desired to reduce the error in a pulsation region including a high reverse flow. In the above conventional techniques have not been made many examinations, with regard to the method of regulating a high pulsation error to a low level.

It is therefore an object of the invention to achieve, under the environments of high pulsations and high reverse flows of an internal combustion engine and the like, a regulation means that reduces a pulsation error of a flowmeter according to the magnitudes and frequencies of the pulsations, and a flowmeter with a reduced pulsation error.

According to one aspect of the invention, in order to reduce the measuring errors of flow rate in pulsations, the flowmeter includes a detection element that outputs a non-linear signal corresponding to a flow rate, and a regulation means that regulates an output signal of the detection element for controlling. And, the regulation means executes output regulation processing that regulates irregularities of the detection element in the output signal, and inequality linearization processing that regulates an average value of the output signal after the output regulation processing by means of regulating parameters.

According to another aspect of the invention, the flowmeter includes a detection element that outputs a non-linear signal corresponding to a flow rate, and a regulation means that regulates an output signal of the detection element for controlling. And, the regulation means executes output regulation processing that regulates irregularities of the detection element in the output signal, separation processing that separates a dc component and an ac component contained in the output signal after the regulation processing, and inequality linearization processing that separately regulates average values of the dc component and ac component contained in the output signal by means of the regulating parameters.

Further, the regulation means executes first conversion processing that converts the output signal into a flow rate signal by means of a first conversion expression according to a characteristic between a flow rate and an output signal, and smoothing processing that varies an amplitude of the flow rate signal after the first conversion processing.

Further, the regulation means executes second conversion processing to a flow rate signal after the smoothing processing by means of a second conversion expression that is used to regulate a flow rate sensitivity based on a relation between the first conversion expression and a reference flow rate.

Further, in the flowmeter that detects a bi-directional flow rate including a reverse flow, with regard to the first conversion expression according to the characteristic between the flow rate and the output signal, at least a characteristic of one direction of characteristics between flow rates of both directions and the output signal is different from a characteristic between the reference flow rate and the output signal.

Further, the flowmeter includes a means to recover a response of an output signal before regulation.

Further, the output signal by the detection element contains a pulsation characteristic, and a regulation means is provided which selectively outputs a regulated pulsation characteristic and a non-regulated pulsation characteristic.

And, in the flowmeter system comprising a flowmeter and a controller that executes an engine control by a signal from the flowmeter, a signal from the controller modifies the regulating parameters of the regulation means.

Further, the controller is provided with a storage means that stores the first and second conversion expressions.

BRIEF DESCRIPTION OF THE DRAWINGS

Other objects and advantages of the invention will become apparent from the following description of embodiments with reference to the accompanying drawings in which:

FIGS. 4A and 4B are explanatory diagrams of digital processing according to the embodiment of the invention;

FIG. 20 is a block diagram of digital processing according to the fourth embodiment of the invention;

FIG. 21 is a block diagram of digital processing according to the fifth embodiment of the invention.

DESCRIPTION OF THE PREFERRED EMBODIMENTS

Figure 1:
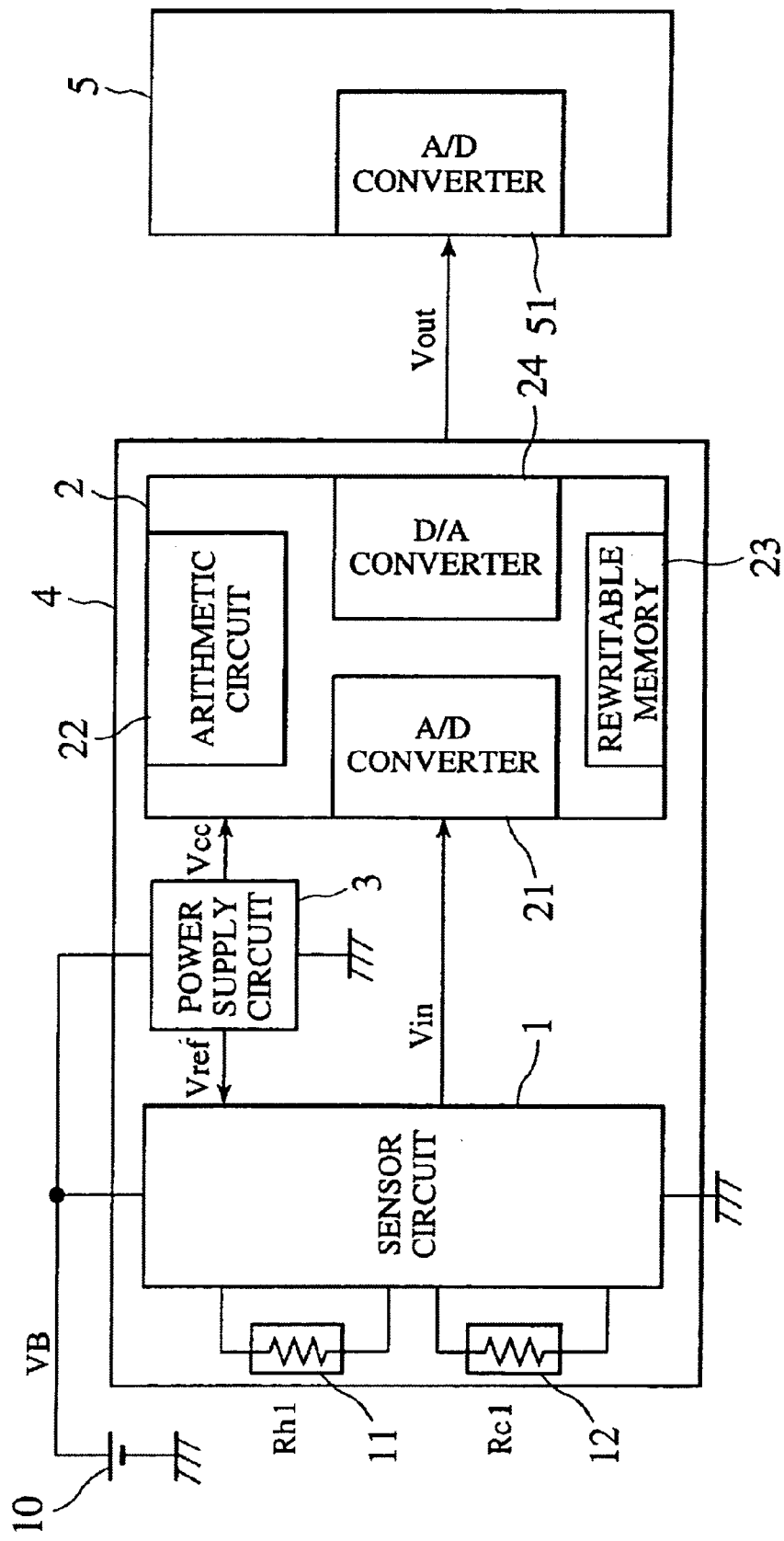
FIG. 1 is a system configuration chart of a flowmeter according to the first embodiment of the invention.

The first embodiment of the invention will be described with reference to FIG. 1. A sensor circuit 1 is connected to a power supply 10 to heat a heating resistor 11 to a constant temperature, and forms a sensing part of a thermal type flowmeter that measures a flow rate running through the heating resistor 11 by the interchange of heats generated according to the flow velocity. A digital error regulation unit 2 composed of digital means including a microcomputer and dedicated logics receives an output signal Vin from the sensor circuit 1. The signal Vin is converted into a digital value by an A/D converter 21. An arithmetic circuit 22 applies an error correction to the digital value according to the correction data provided in a rewritable memory 23. A D/A converter 24 outputs to an engine control unit 5 a voltage value that is equal to the output signal Vin from the sensor circuit 1. The sensor circuit 1, the digital error regulation unit 2, and a power supply circuit 3 to generate a reference voltage constitute a flow rate measuring device 4. In the engine control unit 5, an A/D converter 51 converts an output signal Vout from the flow rate measuring device 4 into a digital value, and the digital value is used for the engine control.

Figure 2:
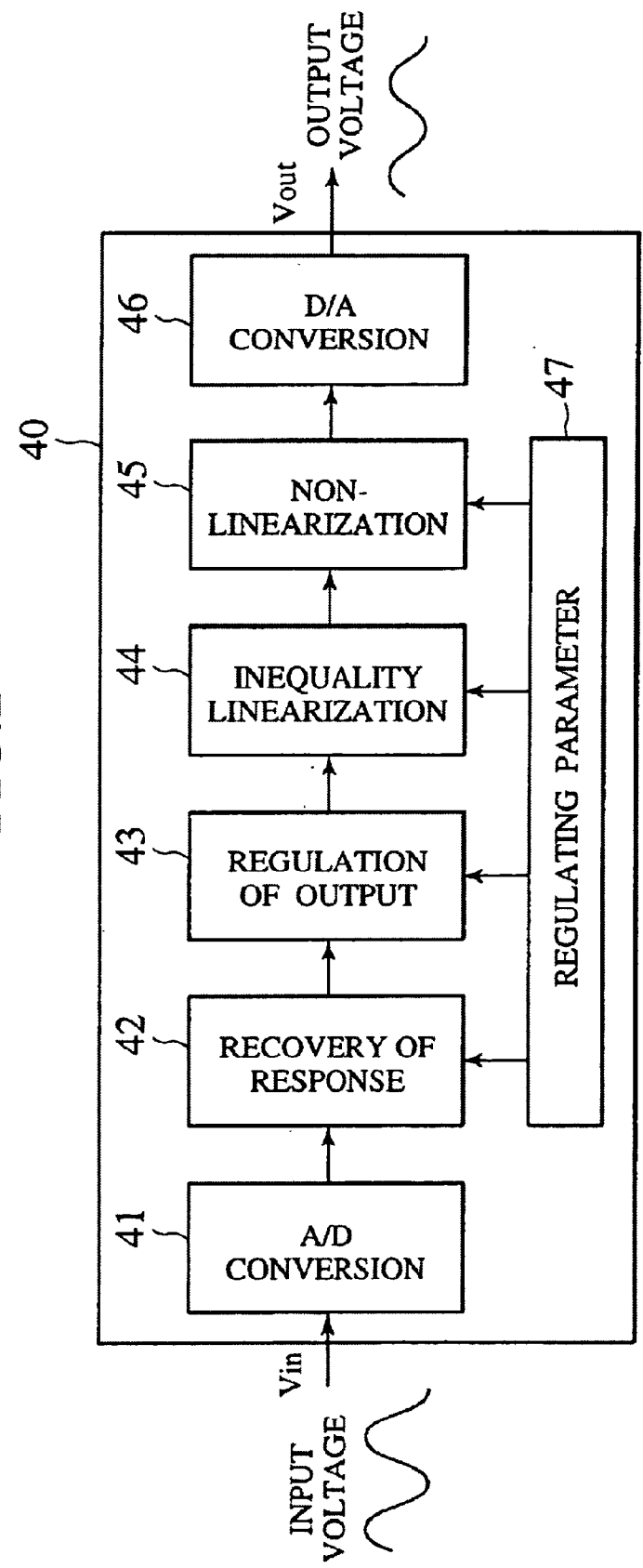
FIG. 2 is a block diagram of digital processing according to the embodiment of the invention.

Next, the processing flow in the digital error regulation unit 2 composed of digital means including a microcomputer and dedicated logics will be explained based on FIG. 2. Operation processing 40 inputs the output Vin from the sensor circuit 1, which is converted into a digital value through A/D conversion processing 41. The digital value is provided with response recovery processing 42 as needed, and thereafter, for absorbing individual irregularities in the sensor characteristic, output regulation processing 43 is applied to the digital value. Thereafter, when the voltage signal from the sensor is converted into a flow rate, to which the smoothing is applied, inequality linearization processing 44 is applied which makes the average values in pulsations variable by using regulating parameters. To the output after the inequality linearization is applied non-linearization processing 45 as needed. D/A conversion processing 46 transmits the voltage signal Vout with a reduced error to the engine control unit 5 as the output from the flow rate measuring device 4.

Here, before the inequality linearization processing 44, the relation between the flow rate and the sensor voltage given in the expression 1 will be explained based on FIG. 3. If the horizontal axis is to represent the flow rate, the output voltage from a sensor draws a non-linear curve, in a manner that the sensitivity at a low flow rate is high and the sensitivity decreases as the flow rate goes up. In a sensor whose output characteristic has such a relation, even if a finely pulsating flow rate as a sine wave inputs, the detected voltage signal becomes slightly distorted owing to the non-linear curve, so as to be compressed on the plus side and be expanded on the minus side. If a value obtained by averaging this voltage signal as it remains is compared with the average value of the flow rate, apparently the average value of the flow rate becomes decreased by the influence of the non-linear curve. This discrepancy becomes increased as the pulsation increases, and as the curve of the voltage against the non-linear flow rate curves larger. Accordingly, it is a usual step to convert (linearize) the signal obtained in the form of the sensor voltage into the flow rate by using the characteristic curve, and thereafter to apply the averaging processing and so forth. To attain this relation, generally the voltage signal from the sensor against the flow rate is measured in practice, and a reference characteristic curve (called master characteristic Qref) is registered in the engine controller 5 or the like. Thereby, the flow rate is calculated and used for various controls.

Next, the method of reducing the pulsation error by the inequality linearization processing 44 will be explained based on FIGS. 4A and 4B. FIG. 4A illustrates processing used for reducing pulsation influences and noises, not for the inequality linearization processing. This is a case in which are inputted sensor voltage signals corresponding to flow rates according to a high amplitude signal Qa1 and a low amplitude signal Qa2, where the average flow rates are equal to Qave1. In a voltage to flow rate conversion processing 441, the sensor voltage signals are converted into flow rates, in accordance with a characteristic curve fx1 equal to a reference characteristic curve Qref. In smoothing processing 442, a digital lowpass filter or the like reduces the pulsating amplitudes of the converted flow rates, and obtains output signals Qaf1, Qaf2. The average values Qavef1, Qavef2 of the smoothed signals become equal. That is, the conversion into the flow rate with the characteristic curve fx1 that is precisely equal to the reference characteristic curve Qref will produce the average value of the flow rate that does not depend on the amplitudes and frequencies of pulsations. However, as to a case in which the flow rates and measured voltage waveforms are distorted depending on high and low amplitudes of the pulsations, and consequently the average values in pulsations involve errors in the average values, this processing does not possess a means of regulating the average values in regard to the magnitudes of pulsations.

In contrast to this, FIG. 4B illustrates a case in which the inequality linearization processing is applied, which provides a means to regulate the average values of the flow rates according to the magnitudes of pulsations. Concretely, after the characteristic curve fx1 different from the reference characteristic curve Qref is established to the same input signals as the previous by regulating parameters, and the input signals are converted into the flow rates in the voltage to flow rate conversion processing 441. In the smoothing processing 442, a digital lowpass filter or the like produces signals with reduced pulsating amplitudes. Thereafter, flow rate sensitivity conversion processing 443 is provided which possesses an output characteristic curve fx2 for compensating an error (dc sensitivity characteristic) in the static characteristic, which is produced according to the difference between the reference characteristic curve Qref and the characteristic curve fx1 in the previous voltage to flow rate conversion processing 441. By way of the output characteristic curve fx2, output signals Qaf1', Qaf2' are obtained. The average values Qavef1', Qavef2' of the smoothed signals become different depending on the signal magnitudes. Therefore, it becomes possible to increase or decrease the average values according to the characteristic curve fx1 in the previous voltage to flow rate conversion processing 441 (this example shows 'increase'). That is, it becomes possible to freely increase or decrease the average values, by modifying the characteristic curve fx1 according to the regulating parameters, and modifying the output characteristic curve fx2 in the flow rate sensitivity conversion processing 443 according to the difference between the characteristic curve fx1 after modified and the reference characteristic curve Qref. Further, modifying the frequency characteristic of the lowpass filter and so forth in the smoothing processing 442 by the regulating parameters will make it possible to increase or decrease the average values, not only by the magnitude of the pulsating amplitudes but also by the difference of the ripple frequencies.

Figure 5:
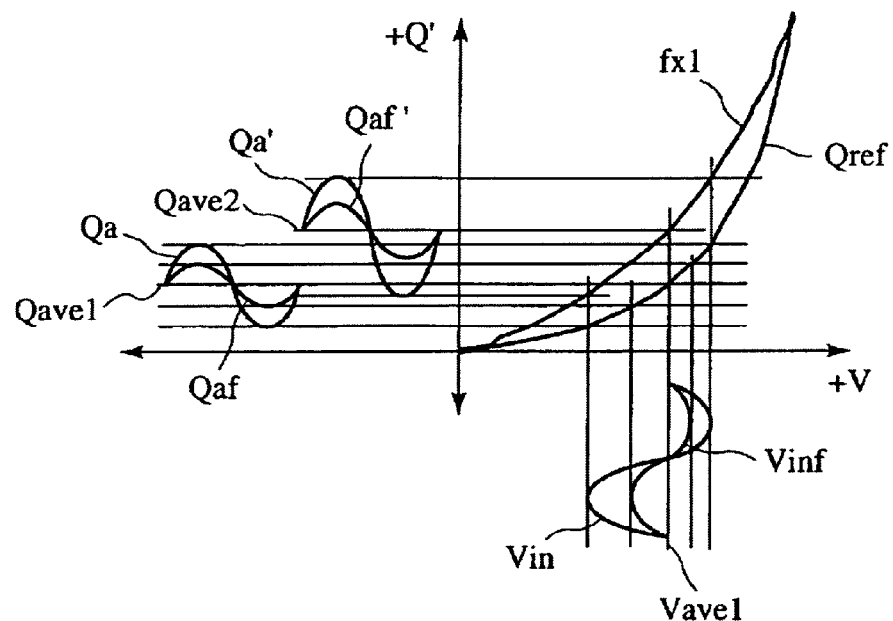
FIG. 5 is a graph illustrating one example of the flow rate against sensor output voltage conversion characteristic.
Figure 6:
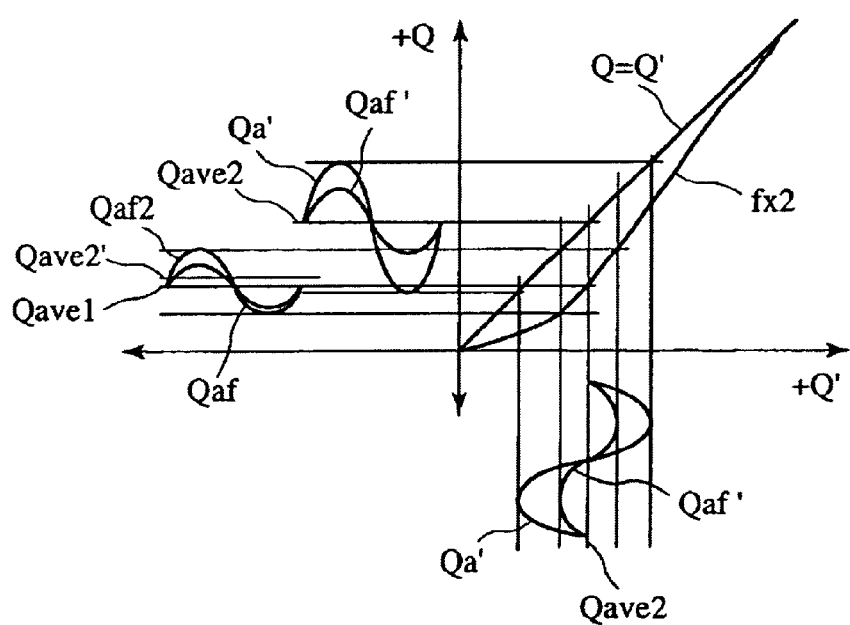
FIG. 6 is a graph illustrating one example of the flow rate sensitivity conversion characteristic.

FIG. 5 illustrates the characteristic curves of the voltage to flow rate conversion processing 441 in detail. Here, according to the relation between the flow rate and the sensor voltage in FIG. 3, a voltage signal Vin is generated in regard to a flow rate signal Qa with a high flow rate, and a voltage signal Vinf is generated in regard to a flow rate signal Qaf in which the flow rate is smoothed and the amplitude is decreased. FIG. 5, arranging the sensor voltage on the horizontal axis, inputs the voltage signals Vin, Vinf. Accordingly, to convert the voltage signals Vin, Vinf into the flow rates by means of the reference characteristic curve Qref will restore the signals equivalent to the flow rate signals Qa, Qaf in FIG. 3. In comparison to this, if the voltage signals Vin, Vinf are converted into the flow rates (or signals Q' corresponding to the flow rates) by means of the characteristic curve fx1 having a gentler curve than the reference characteristic curve Qref, the flow rate signals Qa', Qaf' after conversion will significantly increase the average values thereof, which creates errors when they are viewed as dc signals (static characteristic). To eliminate the dc errors needs to use the flow rate sensitivity conversion processing as shown in FIG. 6.

The output characteristic curve fx2 in the flow rate sensitivity conversion processing 443 will be explained in detail. FIG. 6 arranges the signals Q' corresponding to the flow rates on the vertical axis of FIG. 5 on the horizontal axis, and arranges correct flow rate signals Q after modifying the sensitivity on the vertical axis. If the sensitivity of the flow rate is constant, namely, the flow rate signals are in the equal relation (Q=Q'), both the vertical and horizontal axes will take the equal flow rate signals Qa', Qaf'. With regard to this, in order to compensate the dc sensitivity, by using the output characteristic curve fx2 attained from the difference between the reference characteristic curve Qref and the characteristic curve fx1, the dc sensitivity can be made equal to the average value Qave1 when the previous reference characteristic curve Qref is used. However, the final average value Qave2' in pulsations when the flow rate signal Qaf' after the smoothing processing, for example, is inputted is not equal to the intrinsic average value Qave1. This confirms that the average values in pulsations can be regulated by means of the characteristic curve fx1 by the first conversion means and the output characteristic curve fx2 by the second conversion means, as the dc components of the signals remain intact. The regulating parameters are stored in the rewritable memory 23, and they can be implemented by defining the first and second characteristic curves with a polynomial function, a map conversion to approximate by the linear interpolation, a table conversion, or the like.

Figure 3:
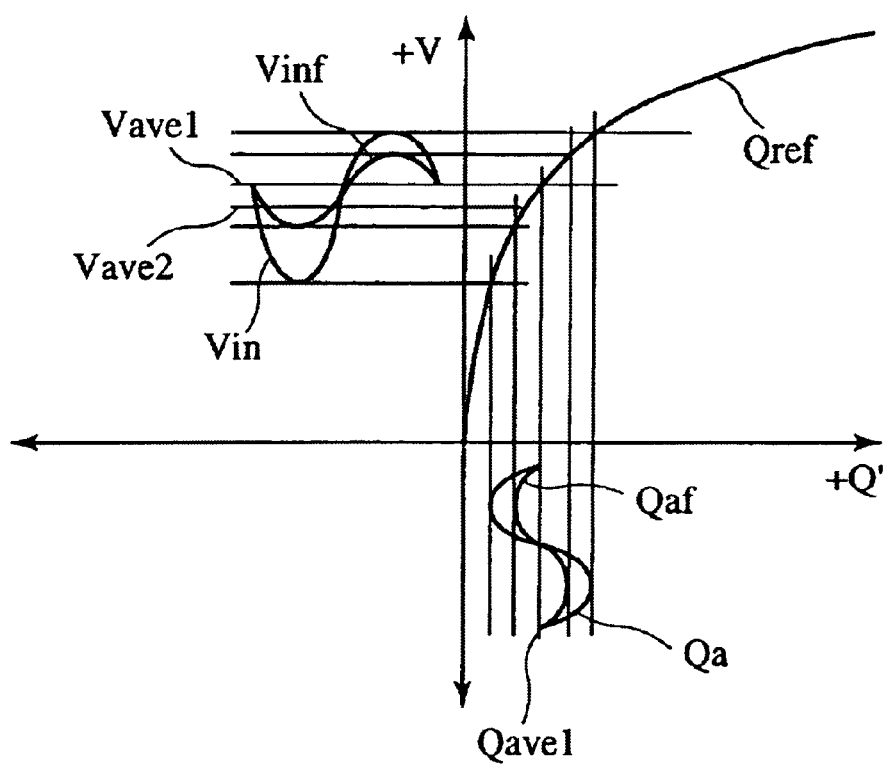
FIG. 3 is a graph illustrating one example of the sensor output voltage against flow rate characteristic.

Therefore, if the non-linearization processing 45 is applied to the flow rate signals after the inequality linearization processing 44 being executed, which converts the flow rate signals into the voltage signals by means of the reference characteristic curve Qref served as the reference for the flow rate and the sensor voltage as shown in FIG. 3, it will be possible to attain a signal in which the error due to pulsations is reduced apparently. If the non-linearization processing is on a premise, the flow rate sensitivity conversion processing 443 in the inequality linearization processing 44 and the non-linearization processing 45 can be implemented with one expression or the map conversion to approximate by the linear interpolation, or the like. In that case, the calculation load by the conversion processing and the quantity consumed of memory will be reduced.

When viewed from the engine control unit 5, the flow rate measuring device 4 for the airflow rate delivers the same voltage output as the sensor circuit 1, in which the fluctuating level of the pulsating amplitudes is reduced while the error in pulsations is regulated. Thus, the method of this embodiment enjoys a system merit that allows the A/D converter 51 of the engine control unit 5 to use a slower sampling frequency and the like, in addition to the error reduction.

Figure 7:
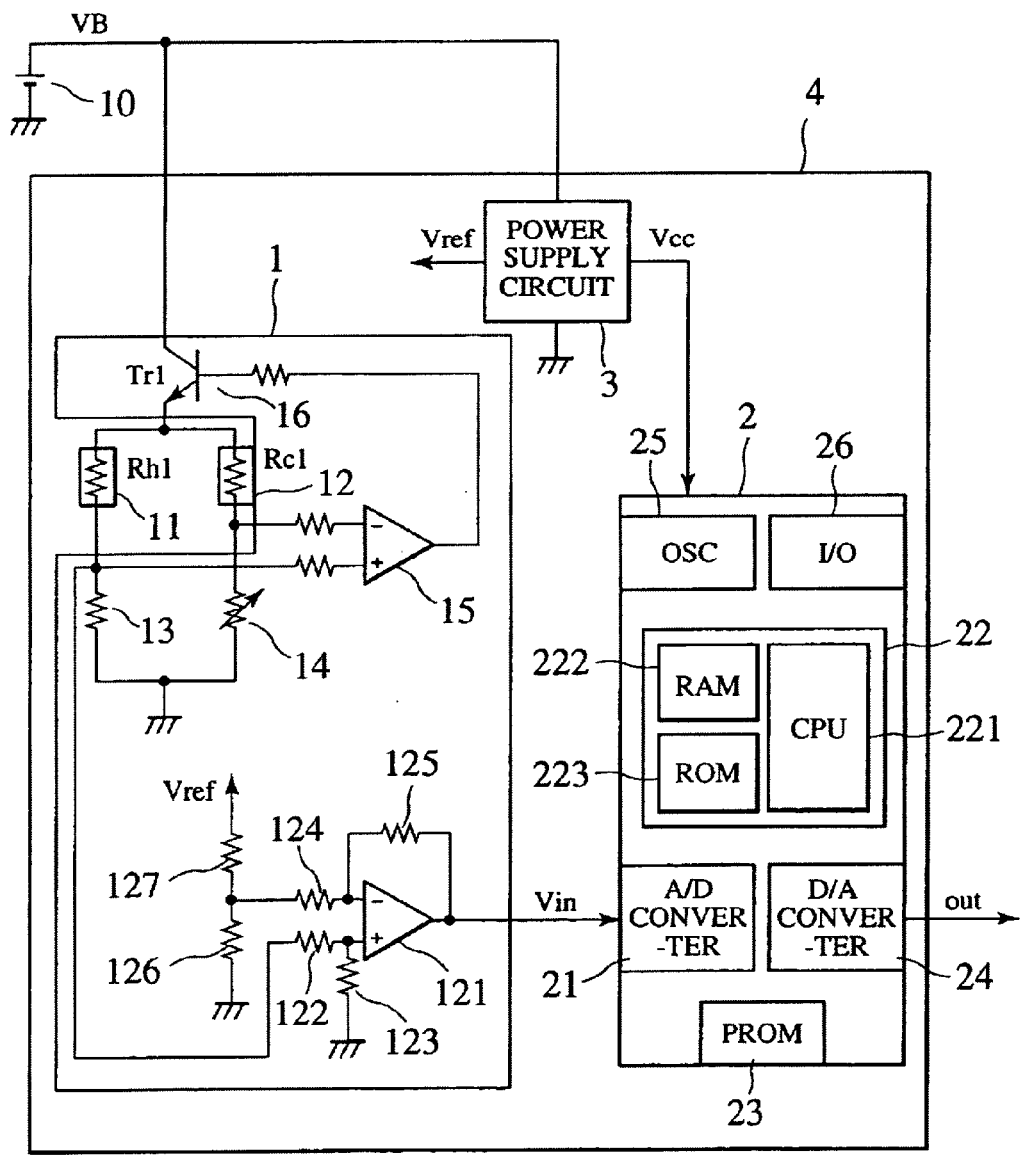
FIG. 7 is a circuit diagram according to the first embodiment of the invention.

Next, the hardware configuration of the first embodiment will be explained in detail based on FIG. 7. This is a typical configuration of a flowmeter that obtains a flow rate directly from a voltage signal based on a heating current into the heating resistor 11. The sensor circuit 1 connected to the power supply 10 outputs a voltage signal corresponding to an airflow rate. In the sensor circuit 1, the heating resistor 11, a temperature compensation resistor 12, resistors 13 and 14 constitute the Wheatstone bridge circuit. This bridge circuit is constructed such that the potential difference of the bridge center becomes zero, by a differential amplifier 15 and a transistor 16 adjusting a current running through the heating resistor 11. This construction controls that the resistance of the heating resistor 11 is kept constant not depending on the flow velocity, namely, the temperature is maintained at a constant value. Then, a zero span circuit receives a signal corresponding to a flow velocity by the heating resistor 11. The zero span circuit is composed of a differential amplifier 121, resistors 122, 123, 124, 125, 126, and 127.

Now, the heating resistor 11 is made such that a heating coil of platinum or tungsten as a heating element is wound on the surface of a cylindrical bobbin made of an insulating material having a high thermal conductivity such as ceramics, and a glass or ceramics as a cladding material is coated thereon. The heating resistor 11 may be made such that a thin film or thick film of platinum or tungsten as a heating element, or a poly-silicon resistor is formed on a base of a plate-type glass, ceramics, silicon, or the like.

The heating resistor 11 is installed in the air intake passage of an internal combustion engine of an automobile or the like. A voltage output corresponding to an airflow rate flowing through the intake passage is obtained as an output of the differential amplifier 121. This voltage output is inputted to the A/D converter 21 that is incorporated in the digital error regulation unit 2 composed of digital means including a microcomputer and dedicated logics, which is converted into a digital value. A CPU 221 in the digital error regulation unit 2 applies the response recovery processing to the digital value as needed, and then carries out the output regulation processing for absorbing the individual irregularities of the sensor characteristic. Thereafter, the inequality linearization processing is carried out, in which the sensor voltage signal is converted into the flow rate according to the first arbitrary conversion expression fx1 and smoothed, and the sensitivity is regulated according to the second conversion expression fx2, and so on. The linearization processing is applied again to the output after the inequality linearization processing, as needed. The D/A converter 24 outputs a non-linear voltage to the engine control unit and so forth.

The digital error regulation unit 2 further includes a non-volatile memory (ROM) 223 being a storage means incorporating flow rate conversion maps and programs served as the references for various flow rate conversion expressions, a rewritable memory (PROM) 23 in which the information of individual differences such as the resistance dispersions of the heating resistor 11, the smoothing rate of the smoothing processing (frequency characteristic, etc.), the regulating parameters to modify various functions by which the inequality linearization processing is applied, and the rate of the response recovery processing and so forth are recorded, a random access memory (RAM) 222 used for the operation work area of the CPU 221, an oscillator (OSC) 25 that generates an internal clock, and so forth. The rewritable memory (PROM) 23 may not be incorporated in the digital error regulation unit 2. It may be one capable of writing more than once, such as a fuse-type ROM, electrically erasable EEPROM, batch erasing flash ROM, and high-speed non-volatile memory utilizing the polarization phenomenon of a ferroelectric film, etc.

Thus, the flowmeter according to the first embodiment is able to reduce the errors due to a non-linearity without sacrificing the basic characteristic of a sensor output from a thermal type flowmeter, and to reduce restrictions for using the sensor. When the flow rate and measured voltage waveforms are distorted in the magnitude of pulsations to create errors in the average values in pulsations, the flowmeter is able to provide a means for regulating the average values to the magnitude of pulsations. And, it is also possible to expand the range of the flowmeter being applied, without being influenced by the external conditions such as the air intake system.

Figure 8A:
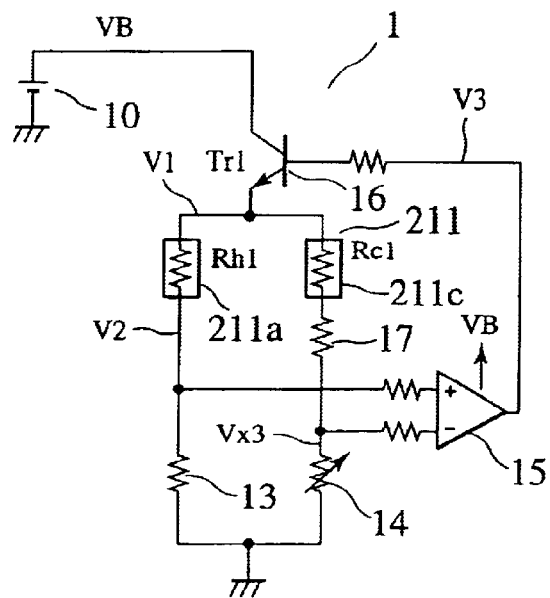
FIGS. 8A and 8B are circuit diagrams according to the second embodiment of the invention.
Figure 8B:
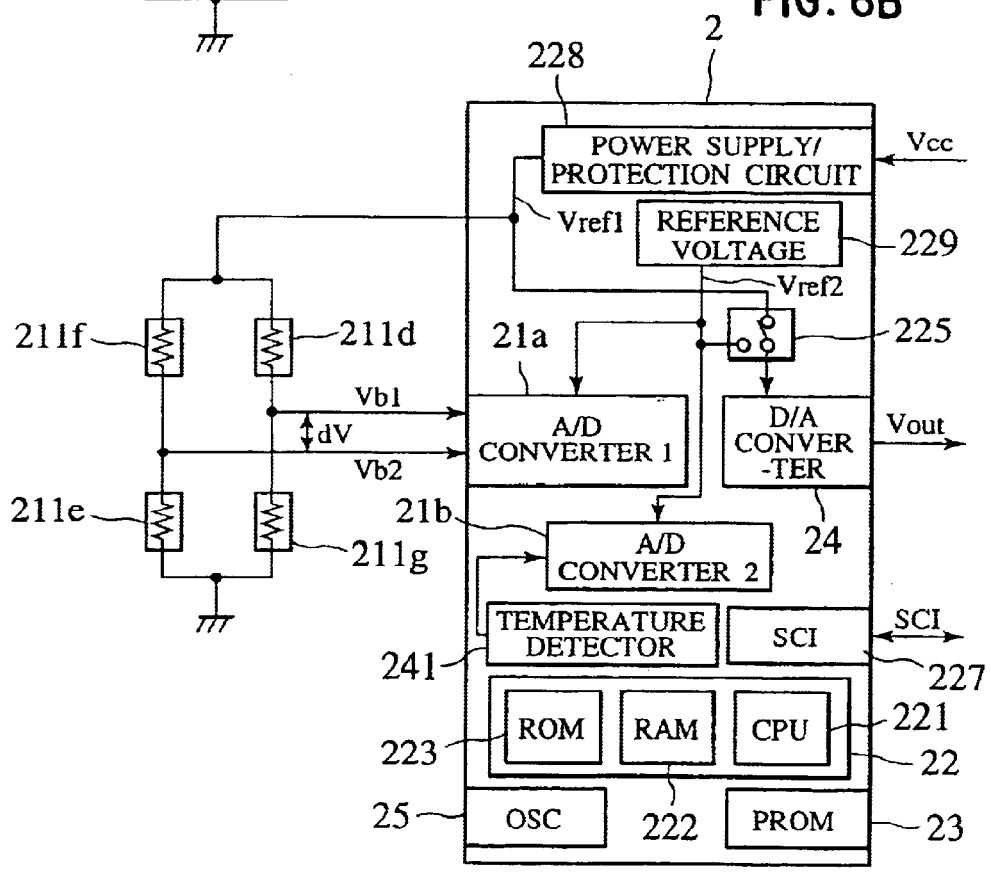

Next, the second embodiment of the invention will be described based on FIGS. 8A and 8B. This is a typical construction that detects a temperature difference according to the direction and magnitude of a temperature flow being heated by a heating resistor. This flowmeter attains a flow rate from a voltage signal according to the temperature difference, which is called a temperature difference type flowmeter. And, the flowmeter enables detection of a reverse flow rate by detecting the flow direction, and it is suitable for detecting a flow rate containing high pulsations.

In the same manner as the previous embodiment, a heating coil drive circuit 1 is connected to the power supply 10. In the heating coil drive circuit 1, the heating resistor 211a, a temperature compensation resistor 211c, resistors 13, 14, and 17 constitute the Wheatstone bridge circuit. This bridge circuit is constructed such that the potential difference of the bridge center becomes zero, by a differential amplifier 15 and a transistor 16 adjusting a current running through the heating resistor 211a. As the heating temperature of the heating resistor 211a is lower, the output from the differential amplifier 15 becomes higher, so that the heating coil drive circuit 1 operates to further heat the heating resistor 211a. This construction controls the current running through the heating resistor 211a, in a manner that the resistance of the heating resistor 211a is kept constant not depending on the flow velocity, that is, the temperature is maintained at a constant value. Temperature detection resistors 211d, 211e, 211f, 211g are placed on both sides of the heating resistor 211a. The temperature detection resistors 211d, 211e, 211f, 211g constitute a bridge, which detects a temperature difference of a resistor from the potential difference of center voltages Vb1, Vb2. This method permits to attain an output corresponding to the flow direction. The temperature detection resistors 211d, 211e, 211f, 211g are driven by constant voltage by a power supply voltage Vref1. This method to detect the temperature difference of a resistor takes on the differential operation, and it has a good sensitivity in the range of a low flow rate, which is suitable for detecting bi-directional flows including a reverse flow.

Figure 9:
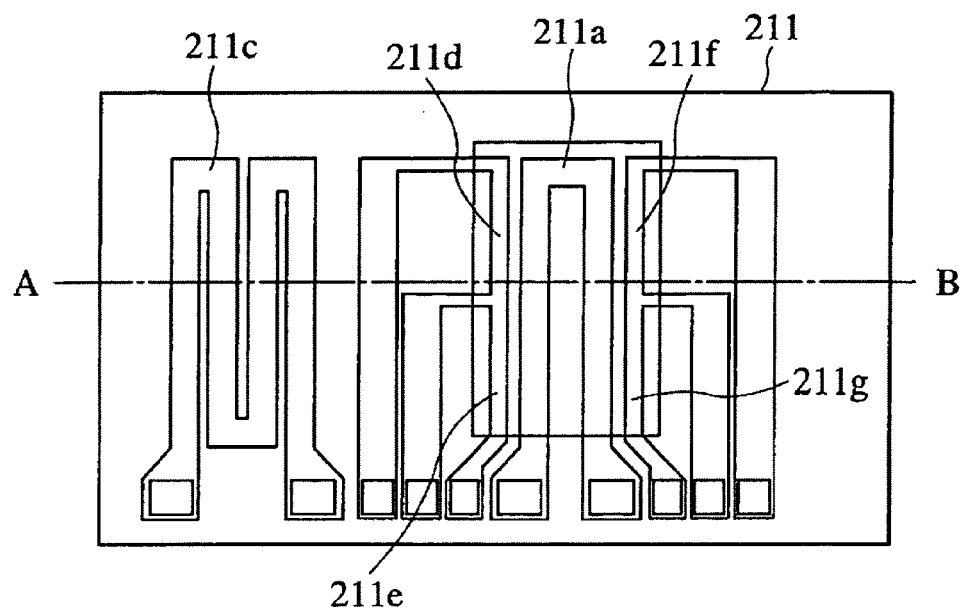
FIG. 9 illustrates a pattern of resistors formed on a silicon substrate.
Figure 10:
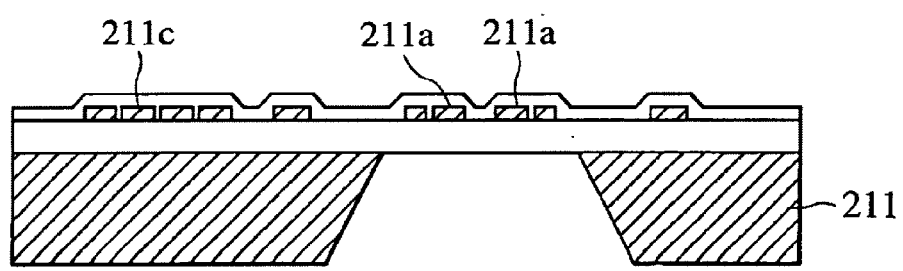
FIG. 10 is a sectional view of the resistors formed on the silicon substrate.

FIG. 9 illustrates one example of a pattern in which the heating resistor 211a is formed with a thin film on a silicon substrate 211. The heating resistor 211a is formed in a longitudinally long pattern, on the middle of which the resistor is folded back. The temperature detection resistors 211d, 211e, 211f, 211g are laid out on both sides of the heating resistor 211a. The heating resistor 211a and the temperature detection resistors 211d, 211e, 211f, 211g are made, for example, by etching the rear side of the silicon substrate 211 in a form that the resistors are arranged on a diaphragm structure having a low thermal capacity. The temperature compensation resistor 211c is laid out on a position being not subject to the influence of temperature by the heating of the heating resistor 211a. FIG. 10 illustrates a sectional structure taken on a line A-B of the silicon substrate 211 in FIG. 9. The areas having resistor patterns are made with the maximum thickness.

In this embodiment, the center potential Vb1, Vb2 of the bridge by the temperature detection resistors 211d, 211e, 211f, 211g are inputted to the digital error regulation unit 2. The digital error regulation unit 2 possesses two A/D converters 21a, 21b. The A/D converters convert the voltage values according to the flow rates into digital values, and regulate by arithmetic operations as the digital values. The D/A converter 24 delivers an output voltage signal Vout to the engine control unit and so forth. Here, the digital error regulation unit 2 is constructed in the same manner as the previous embodiment, however the externally supplied Vcc is inputted to an internal power supply/protection circuit 228 as a power supply. A power supply voltage Vref1 depending on the voltage Vcc is supplied to the A/D converters 21a, 21b, and the D/A converter 24 as a reference voltage, by way of a switch 225. The switch 225 is to switch the power supply voltage Vref1 depending on the voltage Vcc and a voltage Vref2 generated by a reference voltage circuit 229 contained in the digital error regulation unit 2. The A/D converters 21a, 21b directly input the outputs Vb1, Vb2 from the bridge circuit; accordingly they need accuracy. Here, in order to ensure the accuracy as well as reduce the circuit scale, it is only needed to use a $\ddot{A}\acute{O}$ type A/D converter.

The D/A converter 24 is also configured so that the switch 225 can switch the reference voltage. The reason is to freely select the reference when interfacing with analog values. When the reference voltage for the A/D converter on the side of the control unit to be connected and the externally supplied voltage Vcc vary in the same manner or in synchronization, the power supply voltage Vref1 is used as the reference. When the voltage Vcc is irrelevant to the side of the control unit, the independent reference voltage Vref2 is selected. This configuration intends to facilitate matching with a corresponding control unit, and to reduce errors due to unmatched analog interfaces.

With the above configuration of the digital error regulation unit 2, it is possible to provide a flowmeter easy to regulate under the conditions that the pulsations vary with high amplitudes over a wide range from the forward flow to the reverse flow. The operation will be explained in detail based on FIG. 11. This shows reference output characteristics Qrefu, Qrefd of a flowmeter capable of detecting the direction of a flow, which is called the temperature difference type. With regard to the forward or reverse flow rate along the horizontal axis, the sensor voltage also becomes the output signal accompanying the plus or minus sign. When there is a pulsating flow rate including the reverse flow region, a high output voltage Vin is attained to an input flow rate signal Qa. The reason lies in that, since the reference output characteristics Qrefu, Qrefd have a high sensitivity near the origin (zero point), the output amplitude of a signal crossing the zero point becomes large. If the sensor voltage signal is averaged as it remains, the average value is decreased greatly. If the input flow rate signal Qa is compared with a smoothed Qaf, a small fluctuation in the reverse flow region causes a large voltage fluctuation. In view of the relation between the forward and reverse characteristics and the average values in pulsations, there are some relations conceivable, with regard to the voltage to flow rate conversion and the flow rate sensitivity conversion in the inequality linearization processing, to be established to the forward and reverse reference output characteristics Qrefu, Qrefd.

There are two representative cases conceivable. One case is that the reference characteristic Qrefu on the forward flow coincides with the characteristic curve fx1u of the voltage to flow rate conversion characteristic, and the reference characteristic Qrefd on the reverse flow does not coincide with the characteristic curve fx1d of the voltage to flow rate conversion characteristic. Another case is that the reference characteristic Qrefu on the forward flow does not coincide with the characteristic curve fx1u of the voltage to flow rate conversion characteristic, and the reference characteristic Qrefd on the reverse flow does not coincide with the characteristic curve fx1d of the voltage to flow rate conversion characteristic, either.

Figure 11:
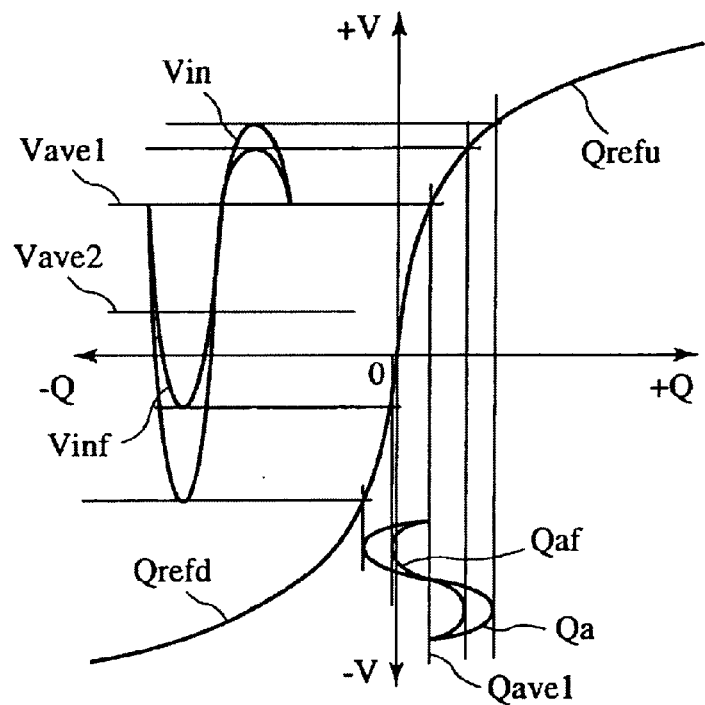
FIG. 11 is a graph illustrating one example of the sensor output voltage against flow rate characteristic in a bi-directional flow rate sensor.
Figure 12:
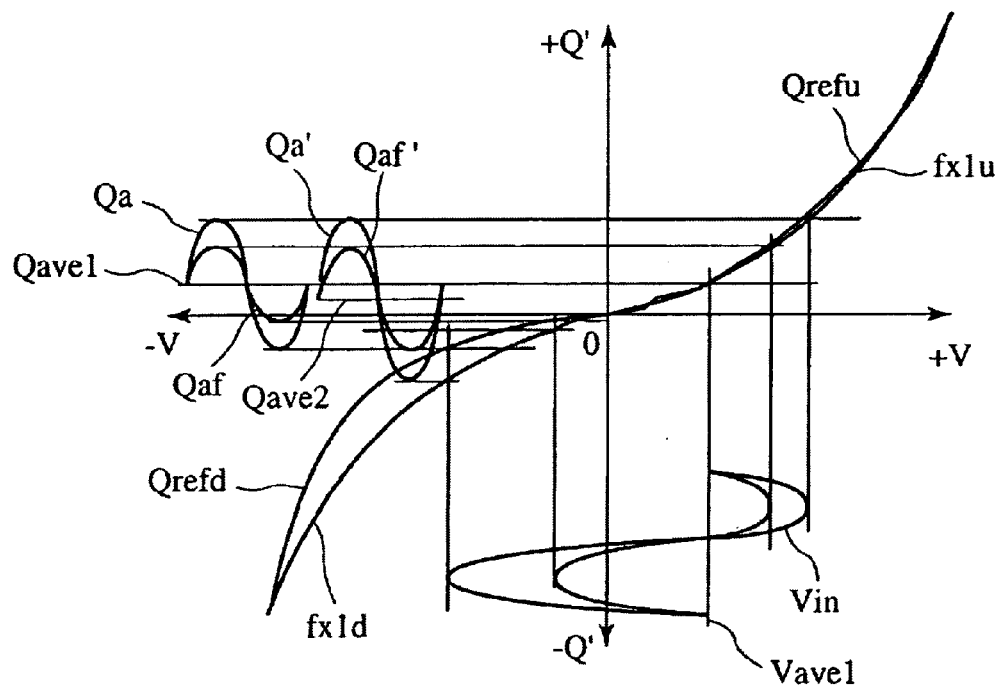
FIG. 12 is a graph illustrating one example of the flow rate against sensor output voltage conversion characteristic in the bi-directional flow rate sensor.
Figure 13:
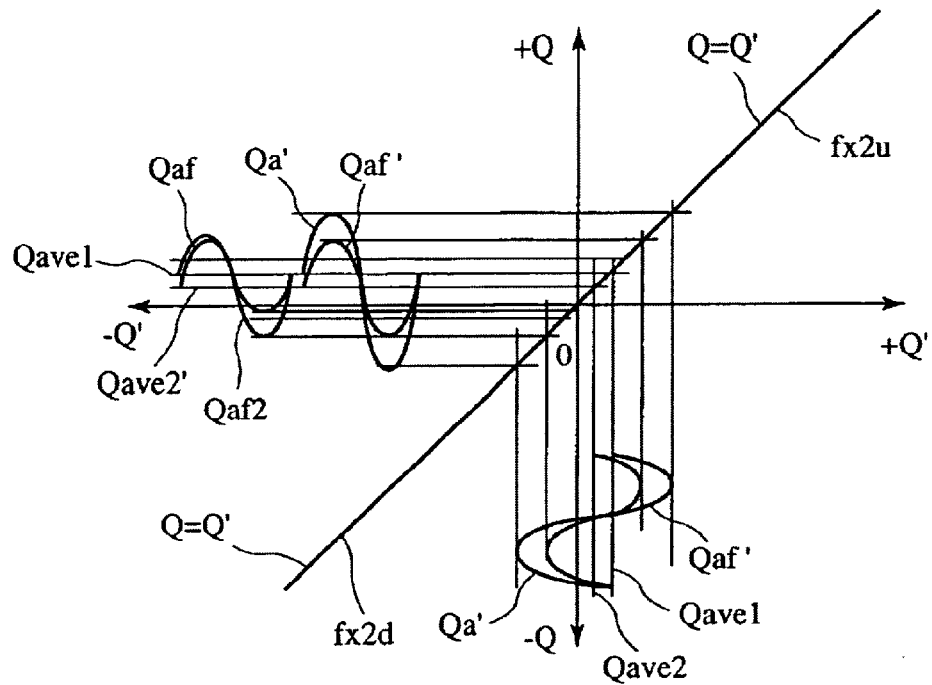
FIG. 13 is a graph illustrating one example of the flow rate sensitivity conversion characteristic in the bi-directional flow rate sensor.

Now, in case that the reference characteristic Qrefu on the forward flow coincides with the characteristic curve fx1u, and the reference characteristic Qrefd on the reverse flow does not coincide with the characteristic curve fx1d, the operation of the inequality linearization processing will be described based on FIG. 12. This drawing arranges a large amplitude voltage on the horizontal axis, which is created by the forward and reverse flow rates illustrated in FIG. 11, and simulates the operation to convert the voltage into the flow rate. When the reverse side takes the reference characteristic Qrefd, the flow rate being the input in FIG. 11 is reproduced. But, if the characteristic curve fx1d is taken, the reverse characteristic will be increased and decreased. Now, attenuating the amplitude of the flow rate signal by the smoothing processing and taking the average Qave2 will decrease the flow rate against the reference average value Qave1. Then, the flow rate sensitivity conversion is applied to the decreased flow rate signal. FIG. 13 illustrates the characteristic of the flow rate sensitivity conversion, in which the characteristics fx2u, fx2d representing the sensitivity of the flow rate are made coincident with the flow rate. Consequently, there does not appear a characteristic conversion by the sensitivity conversion, and the signal Qave2' with the decreased average value in pulsations is finally obtained. The reason that the sensitivity compensation is not applied to the reverse flow side lies in the concept on the use that usually the reverse flow side operates only in pulsations, and the static characteristic including the direct current should be ensured only on the forward flow side. When it is used for controlling an internal combustion engine of an automobile, it is conceivable that there is a reverse flow in pulsations to measure the airflow rate to be absorbed in the cylinder, but there is not a reverse flow in a state of the intake pulsation being not present during a low load. In such a case, if the characteristic on the reverse flow side does not necessarily reflect a true value, discrepancies on the control will be ignored. What is to grasp here is the airflow rate that is absorbed in each cylinder. Therefore, it is only needed that the averaged value is correct. In case of this embodiment, since the sensitivity conversion can be saved, conceivably the regulation of pulsations can be performed more easily, however, the regulation of pulsations is difficult to perform in the state of the reverse flow being not present.

Figure 14:
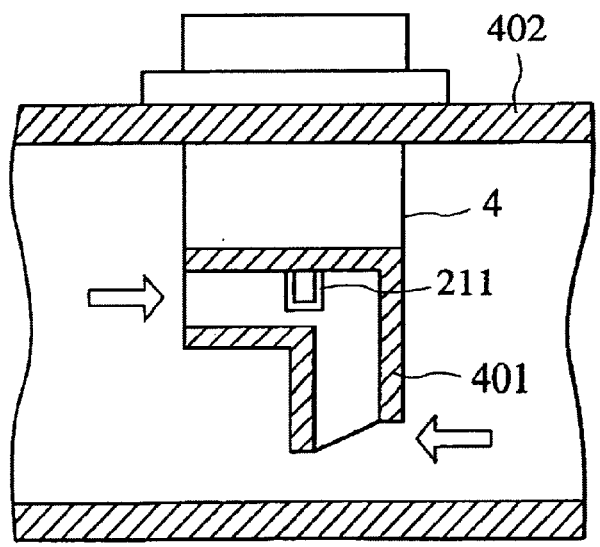
FIG. 14 is a sectional view of a bypass passage installed in an intake pipe.

In case of using a structure as shown in FIG. 14, such that a sensor element 211 is placed inside a bypass passage 401 being asymmetrically structured to the directions of the forward and reverse flows, the flow velocities on the forward and reverse flows do not become symmetrical. In such a case, conceivably the original characteristic on the reverse flow becomes unbalanced against the intrinsic sensor characteristic. In view of these points, the method of compensating the forward and reverse sides both by different characteristic curves is considered to have a wider application range and to exhibit a greater effect.

Figure 15:
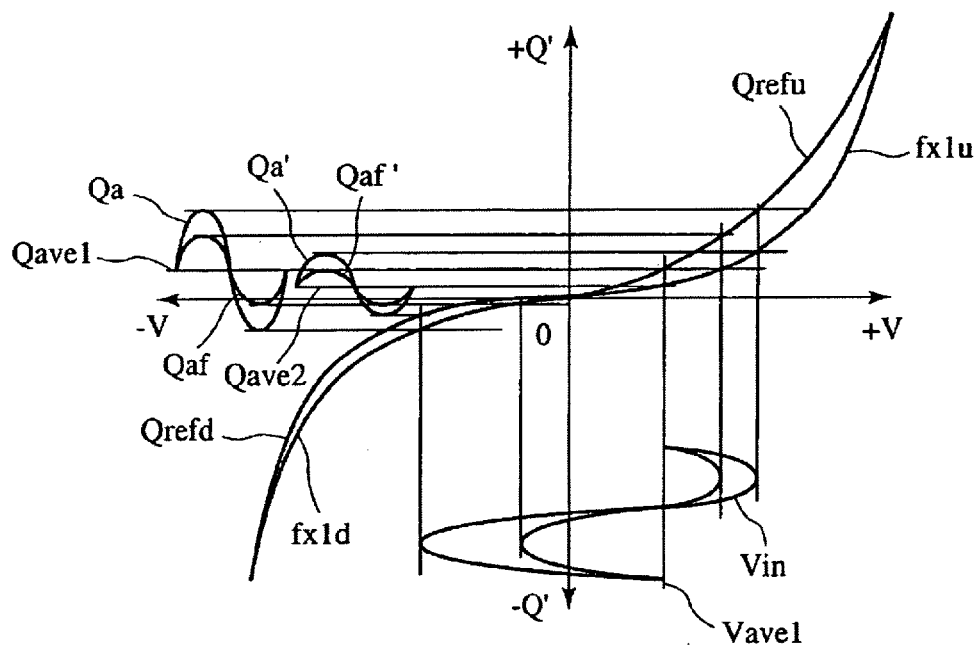
FIG. 15 is a graph illustrating one example of the sensor output voltage against flow rate characteristic in the bi-directional flow rate sensor.

FIG. 15 illustrates an operation in which the inequality linearization processing is executed to the forward and reverse sides both by different characteristic curves. This drawing shows that both the characteristic curve fx1u on the forward flow and the characteristic curve fx1d on the reverse flow have higher sensitivities against the reference characteristics Qrefu, Qrefd in a low flow rate region, and have lower sensitivities (sharp curve) in a high flow rate region. In such a case, the method in FIG. 15 inputs a large amplitude voltage onto the horizontal axis, which is created by the forward and reverse flow rates illustrated in FIG. 11, and simulates the operation to convert the voltage into the flow rate.

Figure 16:
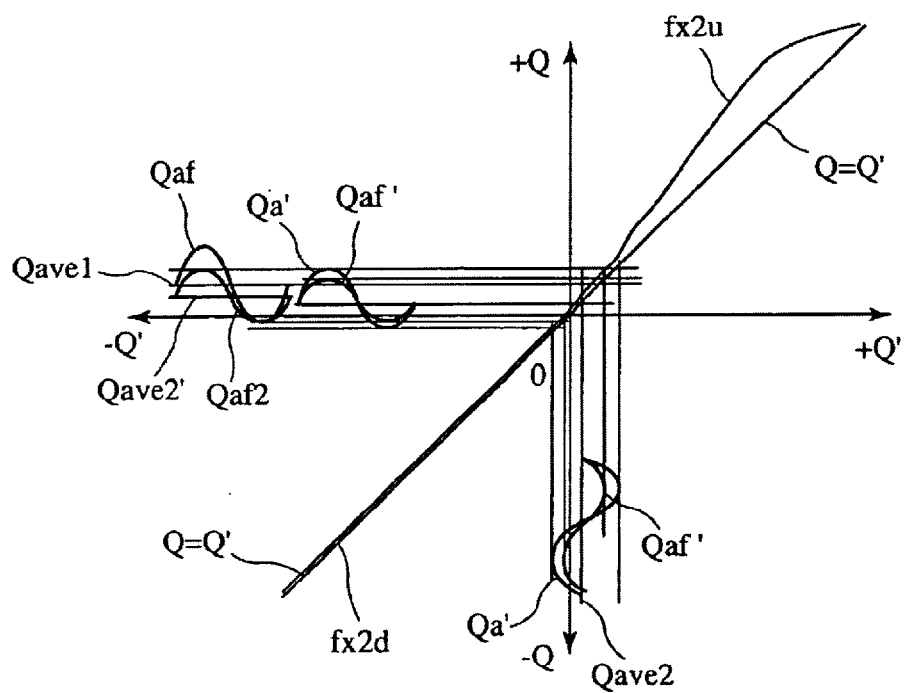
FIG. 16 is a graph illustrating one example of the flow rate against sensor output voltage conversion characteristic in the bi-directional flow rate sensor.

When both the forward and reverse sides take the reference characteristics Qrefu, Qrefd, the flow rate being the input in FIG. 11 is reproduced. But, if the characteristic curves fx1u, fx1d are taken, the forward and reverse characteristics will be increased and decreased. Now, attenuating the amplitude through the flow rate by the smoothing processing and taking the average Qave2 will decrease the flow rate against the reference average value Qave1. Then, the flow rate sensitivity conversion is applied to the decreased flow rate signal. FIG. 16 illustrates the characteristic of the flow rate sensitivity conversion, in which the characteristic fx2d representing the flow rate sensitivity on the reverse side is made coincident with the flow rate, and the sensitivity conversion is applied only to the forward characteristic by the characteristic curve fx2u. This is carried out to regulate pulsating influences, while the accuracy on the forward flow in the static characteristic is maintained. As a result, the final average value Qave2' after the smoothing processing of the flow rate signal Qaf2 becomes smaller than the intrinsic average value Qave1, and a slightly larger than the average value Qave2 when the flow rate sensitivity conversion processing is not applied.

According to this embodiment, it is possible to easily regulate the pulsation errors, even when there are reverse flows and high pulsations, and the sensitivities on the forward and reverse flows are originally different due to the bypass passage and so forth. And, since the regulation of errors to the pulsations is carried out only on the sensor side, the external controller such as the engine control unit does not needs a work to finally modify the flow rate conversion characteristic to match with the sensitivity characteristic, etc., even when the individual sensitivities on the forward and reverse flows are different.

Figure 17:
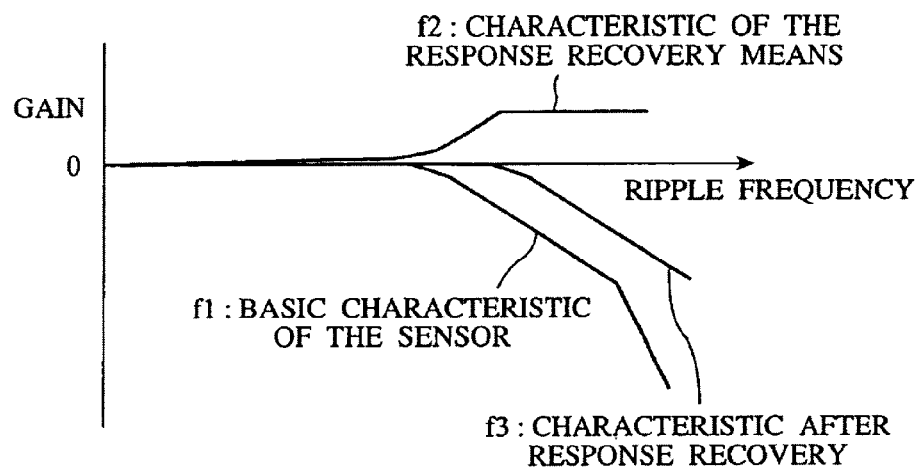
FIG. 17 is a graph illustrating one example of the ripple frequency characteristic in the flow sensor.

Next, the third embodiment of the invention will be described based on FIG. 17. The drawing illustrates a frequency response characteristic against the ripple frequency of the flow rate sensor, in the form of the Bode diagram. Assuming that the amplitude condition of the flow rate is constant, the basic characteristic f1 of the sensor attenuates according to a curve of the first order delay, and in a higher frequency range the amplitude sharply attenuates by the second order delay. In such a case, an occurrence of pulsations or reverse flows in a wide ripple frequency range will expand the measuring error. To lower the thermal capacity by placing the heating resistor on, for example, a silicon diaphragm will improve the response. However in general, the silicon diaphragm needs to have certain strength on its structure, and there is a restriction to lowering the thermal capacity, which leads to a limitation to improving the response. In such a case, an addition of a circuit to recover the response having a certain characteristic f2 and digital signal processing will make it possible to attain a characteristic f3 in which the response has been recovered to some extent.

Figure 18:
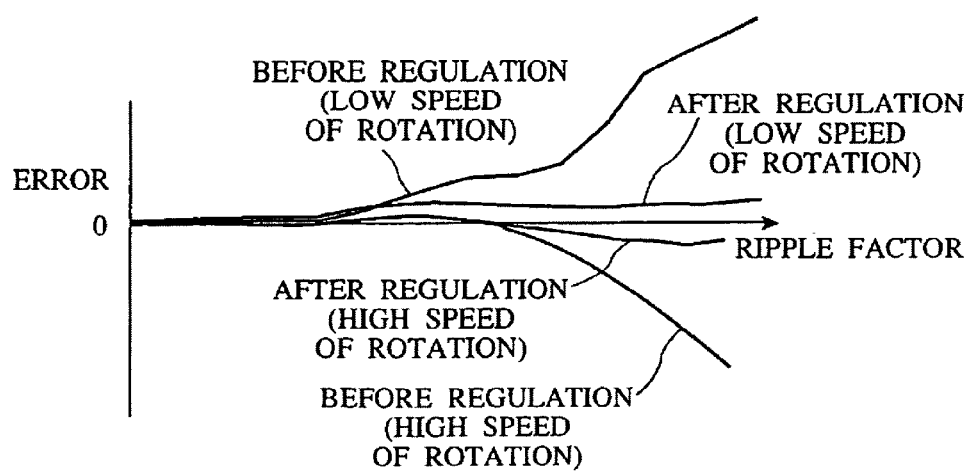
FIG. 18 is a graph illustrating one example of the error characteristic in pulsations.

FIG. 18 illustrates an image of effect when a means to recover the response is employed. The drawing takes the ripple factor on the horizontal axis, and the error in pulsations on the vertical axis. The ripple factor is defined as the magnitude of amplitude against the average value of flow rate, so that the magnitude of reverse flow can be grasped when an ideal pulsation as a sine wave occurs, and it is given by the following expression.

$$\text{Ripple factor} = (\text{maximum value in pulsation} - \text{minimum value in pulsation})/\text{average value} \quad (2)$$

The difference between the maximum value and the minimum value in pulsation shows the amplitude of pulsation. As the ripple factor is larger, the rate of reverse flow occupying in the average value of flow rate can be said larger. In an engine of an automobile, for example, there is a tendency such that as the engine speed becomes higher, the ripple frequency becomes higher, and in a low speed, the ripple frequency becomes low. In such a case, the amplitude of the voltage having the flow rate detected becomes low owing to the response characteristic in a high speed, and it is inclined to show a minus error, from the average value of flow rate. The previous means to recover the response is employed for improving these characteristics, whereby the errors can be reduced. However, in such a case, the ripple factor becomes larger in the lower speed region; and even if there occurred a plus error, the influence by the recovery of response is limited (because the original delay of response is little), and the characteristic does not vary accordingly. In this case, employing the inequality linearization means will make it possible to regulate the pulsation error in the region of a large ripple factor. Accordingly, by using the means to recover the response and the means to regulate the pulsation error in combination in order for achieving the optimization of parameters, it will be possible to reduce the pulsation error at the same time, which is caused by the frequency characteristic of a sensor, such as a response delay.

Figure 19A:
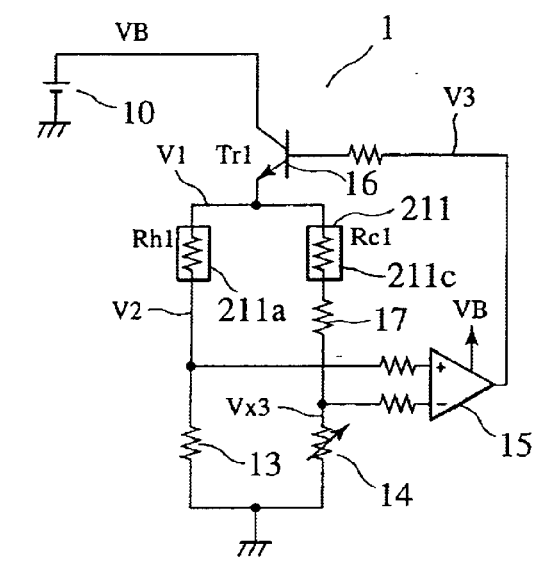
FIGS. 19A and 19B are circuit diagrams according to the third embodiment of the invention.
Figure 19B:
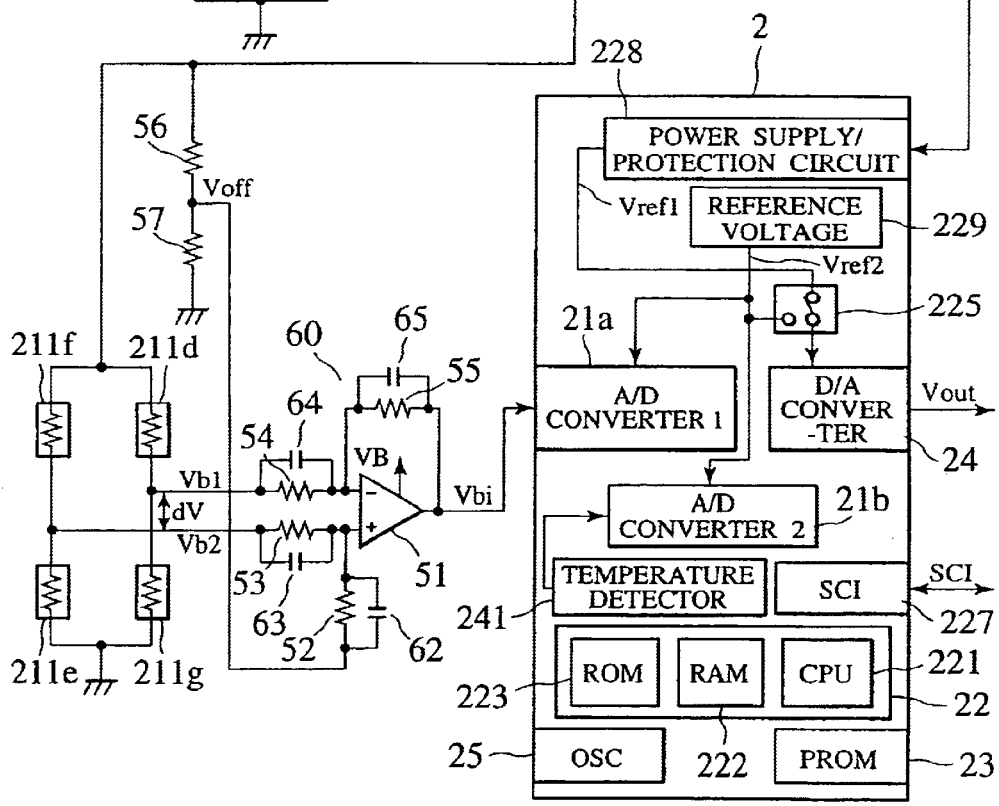

FIGS. 19A and 19B illustrate an example, in which the recovery of response is achieved by means of analog circuits. Here, in the drawing, the analog circuits are employed, but digital processing may be used for recovering the response. In each case, since the response has a flow rate dependency, it is preferable from this point to employ a means that directly recovers the response of the sensor voltage signal for the compensation. FIGS. 19A and 19B basically have the same circuit configuration as the previous FIGS. 8A and 8B. The reference voltage for the temperature difference bridge is supplied from outside. And, a response compensation circuit 50 is additionally provided, which is composed of a differential amplifier 51, resistors 52, 53, 54, 55, and capacitors 62, 63, 64, 65. To appropriately adjust the constants of the resistors and capacitors will modify the characteristic of the means to recover the response. In case of a means using digital processing, to vary the regulating parameters will easily modify the response. To vary the smoothing characteristic of the smoothing means is also effective in increasing and decreasing the frequency characteristic selectively.

According to this embodiment, even when the error characteristic in pulsations varies due to the ripple frequency, the response recovery means has a synthetic regulation means of pulsation errors, which permits to expand the regulation range of pulsation errors. As a result, it becomes possible to expand the applicable range where the flow rate is measured to a variable valve engine and multi-cylinder engine, etc.

Next, the fourth embodiment of the invention will be described based on FIG. 20. The drawing shows the contents of the operation processing 40, in which the regulation including the inequality linearization processing is carried out in real time by the SCI (serial communication interface), etc., of the external controller such as an engine control unit (ECU).

The operation processing 40 first receives the output from the sensor circuit 1 as an input Vin, and the input Vin is converted into a digital value by the A/D conversion processing 41. To the digital value is applied the output regulation processing 43 for absorbing individual irregularities in the sensor characteristic, and the resultant is defined as an original signal S0. Thereafter, the inequality linearization processing 44 is applied to reduce the pulsation error, and an integration procession 48 is applied by the flow rate value, and a correction signal S1 is attained. Thereafter, output signal selection processing 49 selects the input signals S0, S1, and the output format, and outputs as a frequency fout and a voltage signal Vout. In connection with this, communication processing 25 that receives signals from the engine control unit, for example, the SCI signal executes to select the output with or without the inequality linearization processing, and to set and modify the parameters inside the regulating parameters 47. As the regulating parameters are modified, the output result is varied and the pulsation influence can be varied. It becomes possible that the engine controller evaluates the result again, and makes a feedback so as to attain an optimum result. If the real time adjustment of the pulsation error is realized in this manner, even if the engine or the intake system is changed, the matching operation can easily be carried out. This embodiment does not execute the signal compression, etc., with the non-linearization processing. In this case, the integration processing 48 further diminishes the pulsation signal to thereby save the signal compression, etc. The processing inside the digital error regulation unit 2 may be realized by different digital processing means such as a controller for controlling the throttle. The engine control unit may include, in addition to the A/D converter 51 illustrated in FIG. 1, a storage means such as a ROM and a hard disk, and may store to control the conversion expressions in the digital error regulation unit 2. With this system configuration, the same effect can be achieved.

According to the embodiment, even when the pulsation error is varied due to the change of an engine or intake system, it is possible to easily reduce the pulsation error without giving a big change to the intrinsic characteristic of the intake system and the sensor. As a result, it is possible to shorten to a great extent the development term of the measuring system, etc., of an engine intake system.

Next, the fifth embodiment of the invention will be described based on FIG. 21. This shows a case in which the input signal is separated by digital signal processing into a dc component and an ac component, and a correction is applied (inequality linearization processing).

The operation processing 40 receives the output from the sensor circuit 1 as an input Vin, and the input Vin is converted into a digital value by the A/D conversion processing 41. To the digital value is applied the response recovery processing 42 as needed. Thereafter, the output regulation processing 43 for absorbing individual irregularities in the sensor characteristic is applied. Next, as the inequality linearization processing 44, the voltage to flow rate conversion processing 441 that converts a sensor voltage signal into a flow rate is applied to obtain a flow rate value. The flow rate value is separated into a DC component and an AC component by DC-AC separation processing 444. Then, the smoothing processing 442 modifies the pulsation characteristic of the AC component, and the flow rate sensitivity conversion processing 443 compensates the DC component. And, both the components are synthesized again to enter the non-linearization processing 45.

To vary the average value in pulsations by the regulating parameters is realized by varying the characteristic of the voltage to flow rate conversion processing 441 in the same manner as the first embodiment and the smoothing processing of the AC component. Here, the DC-AC separation processing 444 is implemented by executing digital signal processing (DSP), storing sampled digital data for a certain time (buffering), and extracting the distinction of waveforms, etc. According to this embodiment, the arithmetic operation processing increases, however the regulation of errors can be performed more selectively to the ripple frequency, and the regulation accuracy of the pulsation errors can be enhanced.

Figure 22:
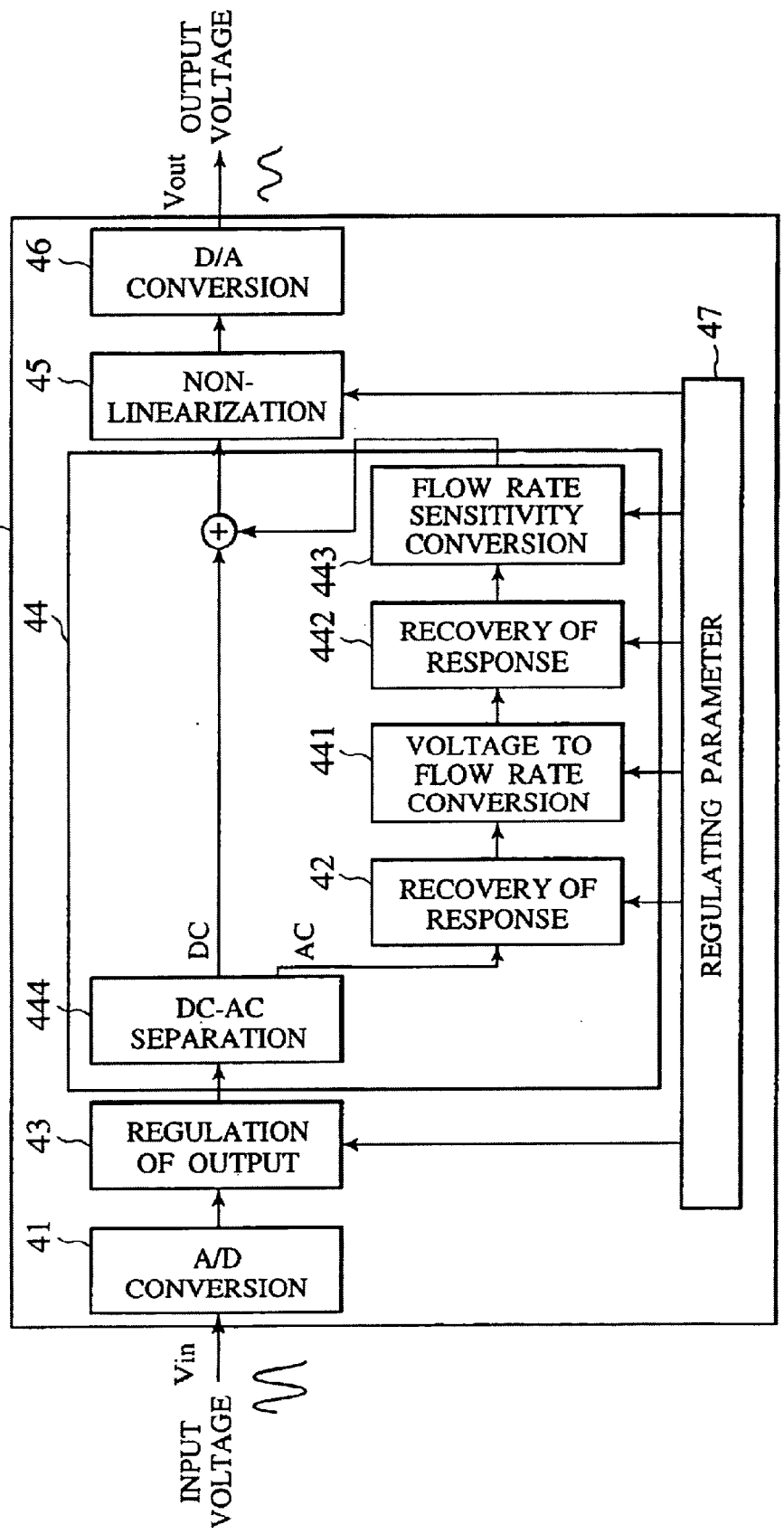
FIG. 22 is a block diagram of digital processing according to the sixth embodiment of the invention.

Next, the sixth embodiment of the invention will be described based on FIG. 22. This shows in the same manner as the former case, a case in which the input signal is separated into a dc component and an ac component, and a correction is applied (inequality linearization processing). However, the difference lies in that the separation of the signal components is first executed, and then the response recovery processing and the voltage to flow rate conversion processing are executed. In the inequality linearization processing 44, the DC component remains intact, but the AC component is given the response recovery processing 42, and the resultant is converted into a flow rate value by the voltage to flow rate conversion processing 441. Thereafter, the flow rate sensitivity conversion processing 443 is applied as needed. Even when the pulsation amplitude is especially small, the regulation of the AC component can be performed with a good sensitivity, since the AC component is separated in advance, thereby enhancing the total accuracy. In case the pulsation occurs very rarely, since the sensitivity compensation is not executed to the DC component, the calculation errors can be reduced accordingly. When the compensation is carried out by separating the input signal into the DC component and the AC component, both cases increase the calculation load, however the contents of the inequality linearization processing may be selected.

In any embodiments described thus far, the measuring errors in pulsations can be reduced, and employing any of them for controlling an engine will enable a high-accuracy control, which reduces exhaust gas and improves fuel consumption.

The application of the flowmeter in the above embodiments to a gas flow detection of hydrogen gas of a fuel cell and so forth will achieve the same effect.

According to the invention, the pulsation errors can easily be reduced without sacrificing the basic characteristic of a sensor output from a thermal type flowmeter, and a user of this sensor is able to easily regulate the pulsation errors. The measuring errors in pulsations can also be reduced, and the use of the flowmeter for controlling an engine will realize a high-accuracy control, thus reducing exhaust gas and improving fuel consumption.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A flowmeter comprising:
   a detection element that outputs a non-linear signal corresponding to a flow rate; and
   an adjustment means that adjusts a signal from the detection element to an appropriate output signal;
   wherein the adjustment means executes output regulation processing that regulates irregularities of the detection element in the output signal, and inequality linearization processing that regulates an average value of the output signal after the output regulation processing by means of regulating parameters.

2. A flowmeter as claimed in claim 1, wherein:
   the adjustment means executes first conversion processing that converts the output signal into a flow rate signal by means of a first conversion expression according to a characteristic between a flow rate and an output signal, and smoothing processing that varies an amplitude of the flow rate signal after the first conversion processing.

3. A flowmeter as claimed in claim 2, wherein:
   the adjustment means executes second conversion processing to a flow rate signal after the smoothing processing by means of a second conversion expression that is used to regulate a flow rate sensitivity based on a relation between the first conversion expression and a reference flow rate.

4. A flowmeter that detects a bi-directional flow rate including a reverse flow, as claimed in claim 3, wherein, with regard to the first conversion expression according to the characteristic between the flow rate and the output signal, at least a characteristic of one direction of characteristics between flow rates of both directions and the output signal is different from a characteristic between the reference floe rate and the output signal.

5. A flowmeter that detects a bi-directional flow rate including a reverse flow, as claimed in claim 2, wherein, with regard to the first conversion expression according to the characteristic between the flow rate and the output signal, at least a characteristic of one direction of chatacteristics between flow rates of both directions and the output signal is different from a characteristic between the reference flow rate and the output signal.

6. A flowmeter as claimed in claim 2, further comprising a means to recover a response of an output signal before regulation.

7. A flowmeter as claimed in claim 1, wherein the output signal by the detection element contains a pulsation characteristic, and a regulation means is provided which selectively outputs a regulated pulsation characteristic and a non-regulated pulsation characteristic.

8. A flowmeter system comprising a flowmeter as claimed in claim 1, and a controller that executes an engine control by using a signal from the flowmeter.

9. A flowmeter system as claimed in claim 8, wherein a signal from the controller modifies the regulating parameters of the adjustment means.

10. A flowmeter system as claimed in claim 8, wherein the controller is provided with a storage means that stores the first and second conversion expressions.

11. A flowmeter comprising:
    a detection element that outputs a non-linear signal corresponding to a flow rate; and
    a regulation means that regulates an output signal of the detection element for controlling;
    wherein the regulation means executes output regulation processing that regulates irregularities of the detection element in the output signal, separation processing that separates a dc component and an ac component contained in the output signal after the regulation processing, and inequality linearization processing that separately regulates average values of the dc component and ac component contained in the output signal by means of the regulating parameters.

12. A flowmeter as claimed in claim 11, wherein:
    the regulation means executes first conversion processing that converts the output signal into a flow rate signal by means of a first conversion expression according to a characteristic between a flow rate and an output signal, and smoothing processing that varies an amplitude of the flow rate signal after the first conversion processing.

13. A flowmeter as claimed in claim 12, wherein:

the regulation means executes second conversion processing to a flow rate signal after the smoothing processing by means of a second conversion expression that is used to regulate a flow rate sensitivity based on a relation between the first conversion expression and a reference flow rate.

14. A flowmeter that detects a bi-directional flow fate including a reverse flow, as claimed in claim 13, wherein, with regard to the first conversion expression according to the characteristic between the flow rate and the output signal, at least a characteristic of one direction of characteristics between flow rates of both directions and the output signal is different from a characteristic between the reference flow rate and the output signal.

15. A flowmeter that detects a bi-directional flow rate including a reverse flow, as claimed in claim 11 or claim 12, wherein, with regard to the first conversion expression according to the characteristic between the flow rate and the output signal, at least a characteristic of one direction of characteristics between flow rates of both directions and the output signal is different from a characteristic between the reference flow rate and the output signal.

16. A flowmeter as claimed in any one of claim 12, further comprising a means to recover a response of an output signal before regulation.

17. A flowmeter as claimed in any one of claim 11, wherein the output signal by the detection element contains a pulsation characteristic, and a regulation means is provided which selectively outputs a regulated pulsation characteristic and a non-regulated pulsation characteristic.

18. A flowmeter system comprising a flowmeter as claimed in any one of claim 10 through claim 17, and a controller that executes an engine control by using a signal from the flowmeter.

19. A flowmeter system as claimed in claim 18, wherein a signal from the controller modifies the regulating parameters of the regulation means.

20. A flowmeter system as claimed in claim 18, wherein the controller is provided with a storage means that stores the first and second conversion expressions.

* * * * *